United States Patent Office 3,510,549
Patented May 5, 1970

3,510,549
PROCESS FOR PREPARING POLYPROPYLENE FILMS HAVING THERMAL SHRINKABILITY
Kazuhiko Tsuboshima and Teruchika Kanoh, Shizuoka-ken, Japan, assignors to Kohjin Company, Limited, Tokyo, Japan, a corporation of Japan
Continuation-in-part of application Ser. No. 690,328, Dec. 13, 1967. This application Apr. 15, 1969, Ser. No. 816,367
Int. Cl. B29c *17/06;* B29d *7/26*
U.S. Cl. 264—95          8 Claims

ABSTRACT OF THE DISCLOSURE

A method is provided for making a film having high thermal shrinkability from a crystalline propylene-ethylene copolymer. The copolymer contains propylene as the major constituent and contains less than 10% ethylene. The copolymer is melted, extruded through an annular die, and cooled to provide a tubular film. The film is then reheated to a temperature above 120° C. and below the melting point of the copolymer and the heated film is simultaneously stretched in both the transverse and longitudinal directions so as to orient the film. The film is then cooled while retaining the stretched condition.

---

Figure 1:
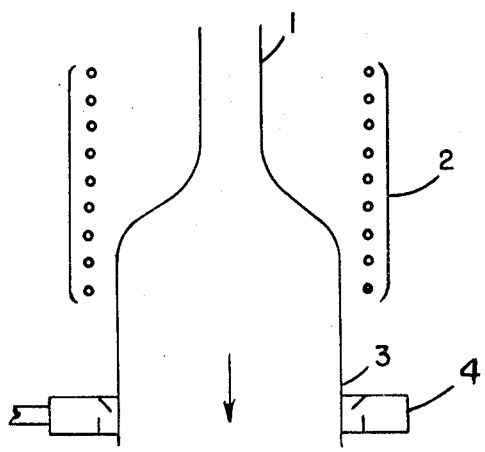

This application is a continuation-in-part of our application Ser. No. 690,328, filed Dec. 13, 1967, now abandoned, and entitled "Process for Preparing Polypropylene Films Having High Thermal Shrinkability."

The present invention relates to a process for preparing films of high thermal shrinkability by extruding and stretching a tubular film formed of a crystalline copolymer of propylene, as the major constituent, and ethylene.

Polypropylene films, produced by melting a polypropylene resin and extruding the melt into thin films, can be stretched to provide the same with thermal shrinkability in the uniaxial direction or biaxial directions in which the films have been stretched. A product enclosed loosely in such thermally shrinkable film may be passed into a tunnel through which hot air is circulated to effect shrinkage of the film and thereby cause it to envelope the product as tightly as possible, resulting in the so-called shrink-packaging.

However, oriented polypropylene film which has been heretofore used in shrink-packaging requires a high temperature for shrinkage. For example, such known polypropylene film must be heated up to about 150° C., a temperature close to the melting point of polypropylene, to obtain a 50% shrinkage. Further the film heretofore known is susceptible to a great variation in shrinkage when subjected to only a small change in temperature near its melting point. Thus, when a product which is loosely enclosed in such known shrinkable film is introduced into a shrink tunnel, incomplete shrinkage of the film and untight packing results if the temperature of the air circulated through such tunnel is too low. On the other hand, if the temperature of the air in such tunnel is increased, the film may melt and/or the rate and degree of film shrinkage may be such as to cause the film to break locally. Further, if the temperature of the hot air in the shrink tunnel is not uniform on the surface of the film, the film shrinks irregularly, causing higher shrinkage at some parts and lower shrinkage at other parts, thus resulting in puckering of the film, which will detract from the appearance of the resulting package.

When a product having good thermal conductivity, such as a metal product, is packaged by shrinking a film about the same, the temperature of such film may differ locally, even if the circulating hot air is at a uniform temperature, depending on whether the film contacts with the product being packaged. This will also result in puckering of the film. Therefore, the process of shrink-packaging using conventional oriented polypropylene films is objectionable in that the hot air in the tunnel for shrinking such films must be accurately controlled to maintain the same at a high temperature within a very narrow range. This requirement demands a very difficult design of heat balance within the tunnel and leads to troublesome operation of such tunnel. An additional disadvantage of shrink-packaging with conventional shrink films is the large probability of rejects due to unsatisfactory packaging.

One object of this invention is to overcome the above-noted defects of known oriented polypropylene films with respect to thermal shrinkage and to provide for high quality, shrink-packaging with less critical control over the hot air temperature used during the film shrinking operation.

Another object of the invention is the provision of a process for producing oriented polypropylene films of high thermal shrinkability which will shrink at relatively low temperatures, when subjected to hot air which is within the necessary range for shrink packaging and will shrink at a rate which will depend as little as possible on temperature variations of such hot air.

In accordance with the present invention, polypropylene films having the above-desired characteristics are produced by using crystalline propylene-ethylene copolymer resin, made mainly from propylene and containing less than the 10%, by weight, of ethylene. This resin is rendered molten and is extruded and quenched to provide a tubular film. The tubular film is then heated to a desired orientation temperature and stretched up to 2.5 to 4.5 times in both its longitudinal and transverse directions.

More particularly, in accordance with the method of the present invention polypropylene film of high thermal shrinkability is prepared by extruding through an annular die a molten crystalline propylene-ethylene copolymer, which is made from propylene as the major constituent and less than 10% by weight and preferably 1 to 6%, by weight, of ethylene, and then quenching the same to provide a tubular film. This cooled tubular film is transferred into a heating zone where it is heated to a temperature not exceeding 135° C. and is maintained over 120° C. for less than 3 seconds while the film is stretched 2.5 to 4.5 times its original size in both longitudinal and transverse directions.

The advantages of using the oriented polypropylene films of this invention over conventional oriented polypropylene films in shrink-packaging operations are that a lower temperature of hot air suffices in the shrink tunnel, the film shrinks uniformly and tightly about an overwrapped product and provides a package which is attractive in appearance, and the percentage of failures during the shink wrapping is remarkably reduced and results in an improvement in the packaging efficiency.

The details of this invention will be described with reference to the attached drawings.

Figure 2:
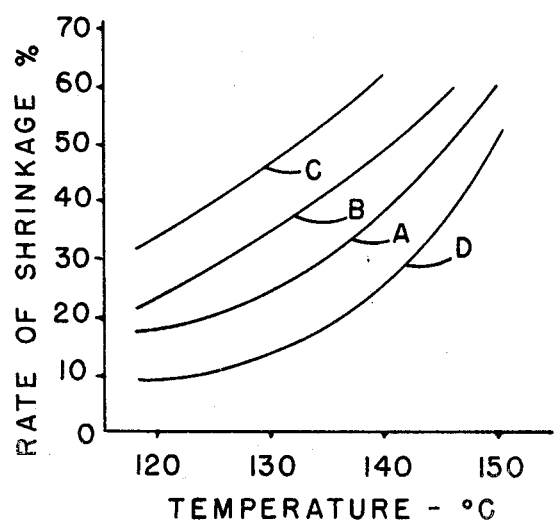

FIG. 1 is a front view showing one manner by which a film may be stretched to molecularly orient the same in the practice of the method of the present invention; and FIG. 2 is a graph illustrating the co-relationship between temperature and thermal shrinkage of oriented polypropylene films.

As illustrated in FIG. 1 an unoriented tubular film 1, formed of crystalline propylene-ethylene copolymer, is heated by an apparatus 2, having annular infrared heaters, and is stretched simultaneously in two directions perpendicular to each other to obtain an oriented film 3. The crystalline propylene-ethylene copolymer employed in making the tubular film 1 primarily consists of propylene as the major constituent and less than 10%, by weight and preferably 1 to 6%, by weight of ethylene. The orientation of the film is achieved by expanding the tubular film by means of a bubble of air or other gas contained therein while simultaneously drawing the film longitudinally as indicated by the arrow in FIG. 1.

The tubular film 1 may be made by any known and convenient manner. Further, in the actual stretching operation subsidiary apparatus, such as those which help smooth the movement and continuous stretching of the film, may be employed but are not illustrated on the drawing since they form no part of the present invention.

During passage through the heating apparatus 2, the tubular film 1 is heated to a temperature above 120° C. but below the melting point of the copolymer and, while at such temperature, is biaxially stretched as described above. The tubular film 1 is stretched from 2.5 to 4.5 times its original dimensions in both longitudinal and transverse directions, with the stretching being effected at such rate that the film does not remain above 120° C. for a period of more than three seconds. Once stretching is completed, the tubular film is cooled in its stretched condition, as by an air ring 4, to a temperature well below 120° C., and preferably to room temperature, and is then collected.

A tubular film formed of crystalline propylene homopolymer and tubular films formed of crystalline propylene-ethylene copolymers containing, by weight 1% and 2% of ethylene, respectively, were each stretched by 3 times in their longitudinal and transverse directions for a period of 2 seconds while at a temperature above 120° C. and below 130° C. The thermal shrinkage characteristics of these respective oriented films are illustrated in FIG. 2 at A, B and C.

As heretofore mentioned, the content of ethylene in the propylene-ethylene copolymer should be less than 10%, by weight with a content of ethylene in the range of from 1 to 6%, by weight being preferred. Less than 1%, by weight of ethylene in the propylene-ethylene copolymer provides little improvement in the thermal shrinkability of the resulting oriented films, while more than 6%, by weight of ethylene in such copolymer provides films which exhibit less desirable strength, transparency and gloss characteristics than conventional oriented polypropylene films.

The rate of thermal shrinkage of the respective films shown in FIG. 2 is the average rate of shrinkage of the two adjacent sides of the sheet 10 cm. x 10 cm. of oriented film during heating for 5 seconds in a glycerine bath kept at a certain temperature. The rate of thermal shrinkage of oriented films which are hereinafter discussed are also determined in the same manner.

It is seen from FIG. 2 that the oriented tubular films formed of propylene-ethylene copolymers shrink at a lower temperature than the oriented tubular film formed of propylene homopolymer, and that the rate of shrinkage of these copolymer films are less dependent upon the particular temperatures to which they are subjected.

FIG. 2 also illustrates at D the rate of thermal shrinkage of a commercial oriented polypropylene film for use in shrink-packaging which has been produced by a two-stage biaxial stretching of a flat film. It will be noted that all of the oriented films produced by simultaneous biaxial stretching of the tubular films have a higher rate of thermal shrinkage at the different temperatures and that their rate of shrinkage is less dependent upon temperature than the film has which has been produced by the two-stage biaxial stretching of a flat film.

Contrary to a possible assumption that the larger the stretch ratio, which determines in general the extent of internal distortion of the molecules of the film, the greater the thermal shrinkability of an oriented film, the present inventors have found that at stretch ratios of 2.5 to 4.5, the resulting oriented films exhibited the maximum rate of thermal shrinkage. This conclusion is supported by the data set forth in Table 1 which shows the rate of thermal shrinkage of oriented films, formed by subjecting tubular films of crystalline propylene-ethylene copolymer, containing 2%, by weight of ethylene, to different stretch ratios (as indicated in the first column) while being heated over 120° C. but not over 125° C. for 2.5 seconds. Stretch ratios of 2.5 to 4.5 provided particularly good rates of thermal shrinkage.

TABLE I

[Relationship between the stretch ratios and the rate of thermal shrinkage (percent)]

| Stretching Ratio (longitudinal x transverse) | Temperature, ° C. | | |
|---|---|---|---|
| | 120 | 130 | 140 |
| | Rate of film shrinkage (percent) | | |
| 2.0 x 2.0 | 24 | 35 | 43 |
| 2.5 x 2.5 | 34 | 48 | 58 |
| 3.5 x 3.5 | 38 | 51 | 66 |
| 4.5 x 4.5 | 33 | 47 | 65 |
| 5.5 x 5.5 | 26 | 41 | 59 |

To illustrate the effect of different stretching temperatures, the wattage of the annular infared heaters of the heating apparatus 2 was adjusted so as to vary the maximum temperature to which films were heated in the heating zone as they passed therethrough. More particularly, tubular films of crystalline propylene-ethylene copolymer containing 2% by weight of ethylene were passed through the heating apparatus 2 and were stretched 3.5 times in a longitudinal direction and 3 times in transverse direction for 3 seconds at various temperatures. The rate of thermal shrinkage of these oriented films are shown in Table II. The temperature of the films during stretching was measured by applying compositions of different known melting points onto small areas of the outside surface of the tubular films and then observing which of such compositions melted during actual stretching of such films.

TABLE II

[Relationship between the maximum stretching temperature and the rate of thermal shrinkage (percent)]

| Maximum stretching temperature, ° C. | Temperature, ° C. | | |
|---|---|---|---|
| | 120 | 130 | 140 |
| | Rate of film shrinkage (percent) | | |
| 145 | 18 | 27 | 48 |
| 135 | 29 | 45 | 62 |
| 120 | 39 | 52 | 66 |
| 100 | Stretching impossible | | |

As is seen from the above table, the lower the maximum temperature of the film at stretching, the better is the thermal shrinkage of the resulting oriented film. Therefore, the maximum temperature is required to be less than 135° C. for a film of high thermal shrinkage to be obtained.

To show the effect of the duration of stretching, tubular films formed of crystalline propylene-ethylene copolymer, containing 2%, by weight of ethylene, were subjected to a maximum temperature of 130° C. and the time interval during which such films were kept over 120° C. was varied by changing the speed of the film through the heating apparatus 2 and the wattage of annular infrared heaters. These tubular films were stretched by 4 times in longitudinal direction and 3.5 times in transverse direction. The resulting oriented films had the rate of thermal shrinkage as shown in Table III. A composition which melts at 120° C. was applied at various spots on the films, and the time interval during which the film was kept over 120° C.

was determined from the moving speed of the film and the range in which such composition melted.

TABLE III

| Time interval film kept over 120° C. during stretching (sec.) | Rate of thermal shrinkage of oriented films at 130° C. |
|---|---|
| 1 | 50 |
| 3 | 48 |
| 9 | 41 |

As seen from Table III, the shorter the time interval during which the tubular film is held over 120° C. during its stretching, the higher is the rate of thermal shrinkage of the resulting oriented film, and that time intervals of less than 3 seconds provide oriented films having the highest degree of thermal shrinkage.

The method of the present invention is further illustrated by the following examples.

EXAMPLE I

Crystalline propylene-ethylene copolymer containing 2%, by weight of ethylene was melted at 240° C., extruded through an annular die and advanced, after being cooled, at the speed of 3 m./min. to provide an unoriented tubular film of 140 microns in thickness and 108 mm. in diameter. This tubular film was passed between a pair of low-speed nip rollers and then between a pair of high-speed nip rollers; and, in-between such pairs of nip rollers, the film was heated with a 20 kw. annular infrared heater and expanded from within by compressed air, in a manner as shown in FIG. 1. The expansion of the tubular film effected by the compressed air therein and the circumferential speed of the pairs of nip rollers were adjusted so that the tubular film was stretched at a ratio of 3.3 in its transverse direction and 3.5 in its longitudinal direction. The thickness of the resulting oriented film was 15 microns. During stretching the film was subjected to a maximum temperature of 130° C. and was kept above 120° C. for a period of 2.5 seconds.

The rate of thermal shrinkage of the resulting oriented film at various temperatures are as follows:

| Shrink temperature (° C.): | Rate of thermal shrinkage, percent |
|---|---|
| 100 | 16 |
| 110 | 25 |
| 120 | 36 |
| 130 | 50 |
| 140 | 62 |

Using the oriented film prepared above, 20 cans of aerosol were separately enclosed loosely so that the area of each film was approximately 1.4 times as large as the total surface area of each can. These overwrapped cans were then transferred to a commercial shrink tunnel into which was blown hot air at a temperature of 160° C. and were passed therethrough in 4 seconds. Each can was neatly packed in a shrunk film tightly attached without any wrinkles. No failure took place in the procedure.

EXAMPLE II

Crystalline propylene-ethylene copolymer containing 3%, by weight of ethylene was melted at 240° C., extruded through an annular die and advanced, after cooled, at the speed of 4 m./min. to provide an unoriented tubular film of 180 microns in thickness and 108 mm. in diameter. The resulting film, using the same system as in Example I, was heated with a 21 kw. infrared heater and stretched at a ratio of 3.0 in both longitudinal and transverse directions to obtain an oriented film 20 microns in thickness. The maximum temperature of the film was 132° C. during stretching and the time interval during which the film was kept over 120° C. was 2 seconds.

The rate of thermal shrinkage of the resulting oriented film at various temperatures are as follows:

| Shrink temperature (° C.): | Rate of thermal shrinkage, percent |
|---|---|
| 100 | 19 |
| 110 | 28 |
| 120 | 40 |
| 130 | 53 |
| 140 | 67 |

Using the oriented film prepared above, 20 boxes of soap, each containing one-half dozen bars of soap, were separately enclosed in loose films so that the area of each film was about 1.5 times as large as the total surface area of each box. Each of these overwrapped boxes were then passed into a commercial shrink tunnel, into which hot air at the temperature 155° C. was blown, and were passed therethrough in 6 seconds. The resulting packages of soap boxes were neatly and tightly enclosed in shrunk films without any wrinkles. No failures in packaging took place.

We claim:

1. A process for preparing films of high thermal shrinkability which comprises: melting crystalline propylene-ethylene copolymer containing propylene as the major constituent and less than 10%, by weight, of ethylene; extruding the melted copolymer through an annular die; cooling the extruded copolymer to provide a tubular film; heating the tubular film to within an orientation temperature range of from above 120° C. and below the melting point of the copolymer thereof; maintaining the tubular film within such temperature range for a period not greater than 3 seconds; stretching the tubular film by 2.5 to 4.5 times its size simultaneously in both the longitudinal and transverse directions while it is within the orientation temperature range; and thereafter cooling the tubular film to a temperature below 120° C. while it is retained in its stretched condition.

2. A process of claim 1 wherein the tubular film is at a temperature below 135° C. during the stretching thereof.

3. A process of claim 1 wherein the copolymer contains from 1% to 6%, by weight of ethylene.

4. A process of claim 1 wherein the tubular film is at a temperature below 135° C. during the stretching thereof and the copolymer contains from 1% to 6%, by weight, of ethylene.

5. A process of claim 4 wherein the tubular film is at a temperature above 125° C. during the stretching thereof.

6. A process of claim 4 wherein the copolymer contains about 3%, by weight of ethylene.

7. A process of claim 4 wherein the tubular film is stretched by 3.0 to 4.0 times its size in both the longitudinal and transverse directions while it is within the orientation temperature range.

8. A process of claim 4 wherein the tubular film is at a temperature below 130° C. during the stretching thereof.

References Cited

UNITED STATES PATENTS

| 3,141,912 | 7/1964 | Goldman et al. | 264—95 |
| 3,248,463 | 4/1966 | Wiley et al. | 264—95 |
| 3,374,213 | 3/1968 | Hoeg | 260—88.2 |

ROBERT F. WHITE, Primary Examiner

J. H. SILBAUGH, Assistant Examiner

U.S. Cl. X.R.

264—209